(12) United States Patent
Torii

(10) Patent No.: US 11,782,171 B2
(45) Date of Patent: Oct. 10, 2023

(54) RADIATION IMAGING APPARATUS, METHOD FOR CONTROLLING SAME, AND STORAGE MEDIUM

(71) Applicant: CANON KABUSHIKI KAISHA, Tokyo (JP)

(72) Inventor: Sota Torii, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/465,710

(22) Filed: Sep. 2, 2021

(65) Prior Publication Data

US 2022/0075084 A1    Mar. 10, 2022

(30) Foreign Application Priority Data

Sep. 10, 2020   (JP) ................. 2020-152113

(51) Int. Cl.
  *G01T 1/17*   (2006.01)
  *G01T 1/36*   (2006.01)
  *G01T 7/00*   (2006.01)

(52) U.S. Cl.
  CPC .................. *G01T 1/17* (2013.01); *G01T 1/36* (2013.01); *G01T 7/00* (2013.01)

(58) Field of Classification Search
  CPC ................ G01T 1/17; G01T 1/36; G01T 7/00
  See application file for complete search history.

(56) References Cited

U.S. PATENT DOCUMENTS

| 2018/0006080 A1* | 1/2018 | Fujiyoshi | A61B 6/4233 |
| 2018/0152683 A1* | 5/2018 | Wei | G06T 3/4015 |
| 2018/0309944 A1* | 10/2018 | Lee | H04N 25/62 |

FOREIGN PATENT DOCUMENTS

JP    2005137509 A    6/2005

\* cited by examiner

*Primary Examiner* — Hugh Maupin
(74) *Attorney, Agent, or Firm* — CANON U.S.A., INC. IP Division

(57) ABSTRACT

An apparatus includes a detection unit including a plurality of two-dimensionally arranged pixels with a plurality of lines located between adjacent pixels, configured to detect an incident radiation and output signals related to a radiation image, a calculation unit configured to calculate a crosstalk ratio related to crosstalk occurring between the adjacent pixels with the plurality of lines therebetween in the detection unit, and a correction unit configured to make a correction to pixel data on a pixel affected by the crosstalk among a plurality of pieces of pixel data constituting the radiation image based on the crosstalk ratio.

15 Claims, 9 Drawing Sheets

RADIATION IMAGE A

CORRECTED IMAGE B

RADIATION IMAGING APPARATUS, METHOD FOR CONTROLLING SAME, AND STORAGE MEDIUM

BACKGROUND OF THE DISCLOSURE

Field of the Disclosure

The aspect of the embodiments relates to a radiation imaging apparatus for performing radiation imaging, a method for controlling the same, and a storage medium storing a program for causing a computer to perform the control method. More specifically, an apparatus that captures a still image by radiography or captures a moving image by fluoroscopy for medical diagnosis is suitably used as the radiation imaging apparatus, for example.

Description of the Related Art

Flat panel detectors (FPDs) for capturing a radiation image have been widely put to practical use in recent years. An FPD includes a plurality of two-dimensionally arranged pixels each including a conversion element that is an element made of amorphous silicon or monocrystalline silicon and configured to convert incident radiation into an electrical signal. FPDs are characterized by the occurrence of crosstalk, by which the electric signals from conversion elements affect surrounding conversion elements, since the plurality of conversion elements is arranged close to each other. The crosstalk includes various phenomena, including variations in the output of the conversion elements (such as photodiodes) due to leakage and a change in wiring resistance.

Concerning the crosstalk, Japanese Patent Application Laid-Open No. 2005-137509 discusses a technique of reducing degradation in image quality due to crosstalk by obtaining crosstalk ratios, or the ratios of the amounts of crosstalk each pixel exerts on surrounding pixels, in advance and correcting the radiation image using the crosstalk ratios.

However, according to the technique discussed in Japanese Patent Application Laid-Open No. 2005-137509, all the pixel data on the pixels surrounding each pixel among a plurality of pieces of pixel data constituting a radiation image is supposed to be corrected. Thus, there has been an issue of difficulty in performing efficient correction processing since the load of the correction processing becomes enormous.

SUMMARY OF THE DISCLOSURE

According to an aspect of the embodiments, an apparatus includes a detection unit including a plurality of two-dimensionally arranged pixels with a plurality of lines located between adjacent pixels, configured to detect an incident radiation and output signals related to a radiation image, a calculation unit configured to calculate a crosstalk ratio related to crosstalk occurring between the adjacent pixels with the plurality of lines therebetween in the detection unit, and a correction unit configured to make a correction to pixel data on a pixel affected by the crosstalk among a plurality of pieces of pixel data constituting the radiation image based on the crosstalk ratio.

Further features of the disclosure will become apparent from the following description of exemplary embodiments with reference to the attached drawings.

DESCRIPTION OF THE EMBODIMENTS

Exemplary embodiments for implementing the disclosure will be described below with reference to the drawings. Components described in the following exemplary embodiments of the disclosure are merely illustrative, and the technical scope of the disclosure is determined by the claims and not limited by the following descriptions of the exemplary embodiments. Further, in the following exemplary embodiments of the disclosure, X-rays are suitably used as radiation. However, the disclosure is not limited thereto. For example, other radiation such as a, 13, and y rays can also be applied to the exemplary embodiments of the disclosure.

Figure 1:
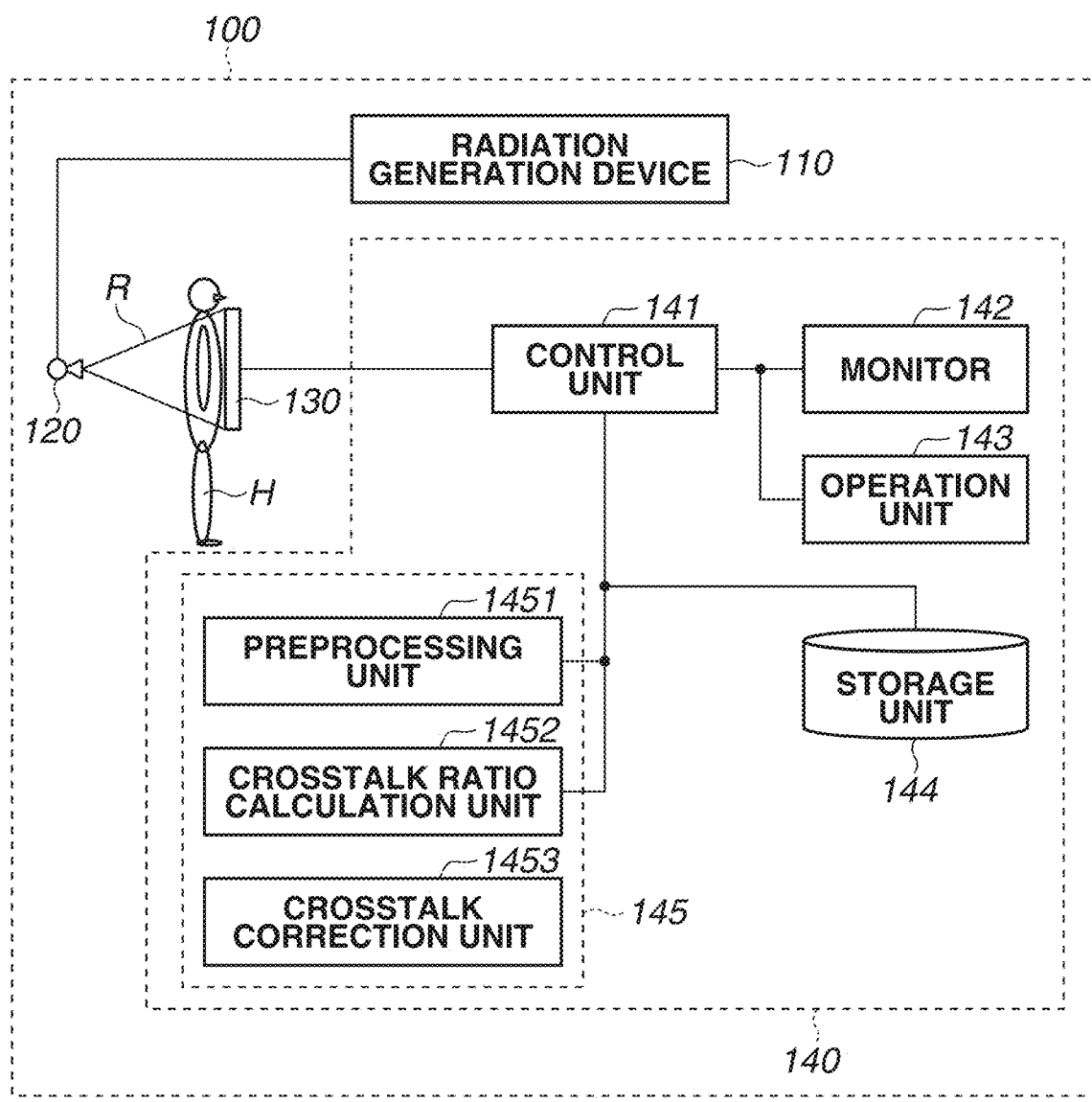
FIG. 1 is a block diagram schematically illustrating an example of a configuration of a radiation imaging apparatus according to a first exemplary embodiment of the disclosure.

First, a first exemplary embodiment of the disclosure will be described. FIG. 1 is a block diagram schematically illustrating an example of a configuration of a radiation imaging apparatus 100 according to the first exemplary embodiment of the disclosure. The radiation imaging apparatus 100 illustrated in FIG. 1 may be referred to as a "radiation imaging system". As illustrated in FIG. 1, the radiation imaging apparatus 100 includes a radiation generation device 110, a radiation tube (e.g., X-ray tube) 120, a flat panel detector (FPD) 130, and an information processing device 140.

The radiation generation device 110 applies high voltage pulses to the radiation tube 120 to generate radiation R in response to pressing of an exposure switch (not illustrated). The radiation tube 120 emits the radiation R toward an object H. In the present exemplary embodiment, the type of radiation R is not limited in particular, and X-rays are typically used.

When the object H is irradiated with the radiation R from the radiation tube 120, the FPD 130 detects incident radiation R (including radiation R transmitted through the object H) as an image signal (electrical signal) related to a radiation image, and generates the radiation image. The FPD 130 then transfers the generated radiation image to the information processing device 140.

The information processing device 140 processes the radiation image generated by the FPD 130, processes various types of information, and performs various types of control. As illustrated in FIG. 1, the information processing device 140 includes a control unit 141, a monitor 142 corresponding to a display unit, an operation unit 143, a storage unit 144, and an image processing unit 145.

The control unit 141 controls, for example, operation of the information processing device 140 in a centralized manner and performs various types of processing.

The monitor 142 displays the radiation image (digital image) received by the control unit 141 from the FPD 130, an image processed by the image processing unit 145, and various types of information based on the control by the control unit 141.

The operation unit 143 inputs instructions, for example, for the image processing unit 145 and the FPD 130 into the control unit 141. The operation unit 143 accepts, for example, the input of instructions for the FPD 130 via a user interface.

The storage unit 144 stores various types of information (including programs) to be used for the processing of the control unit 141 and the image processing unit 145, and various types of information and various images obtained as a result of the processing by the control unit 141 and the image processing unit 145. For example, the storage unit 144 can store the radiation image output from the control unit 141, an image processed by the image processing unit 145, and information obtained as a result of calculation by the image processing unit 145. The storage unit 144 includes, for example, a read-only memory (ROM) and a random access memory (RAM).

The image processing unit 145 performs image processing on the radiation image output from the control unit 141, for example. As illustrated in FIG. 1, the image processing unit 145 includes a preprocessing unit 1451, a crosstalk ratio calculation unit 1452, and a crosstalk correction unit 1453. The functions of these component units 1451 to 1453 can be implemented, for example, by using one or a plurality of central processing units (CPUs) and programs read from the storage unit 144. The component units 1451 to 1453 of the image processing unit 145 may be constituted by hardware, such as an integrated circuit, as long as the same functions are implemented. The information processing device 140 may also include, as its internal configuration, component units including a graphic control unit such as a graphics processing unit (GPU), a communication unit such as a network card, an input/output control unit such as a keyboard, a display, and a touch panel. Details of the component units 1451 to 1453 of the image processing unit 145 will be described below.

Next, details of an internal configuration of the FPD 130 illustrated in FIG. 1 will be described. The FPD 130 includes a radiation detection unit (radiation detection unit 131 in FIG. 3 to be described below) including a plurality of two-dimensionally arranged pixels for generating electrical signals based on radiation. The radiation detection unit of the FPD 130 detects incident radiation R (including radiation R transmitted through the object H) as an image signal (electrical signal) related to a radiation image.

Figure 2:
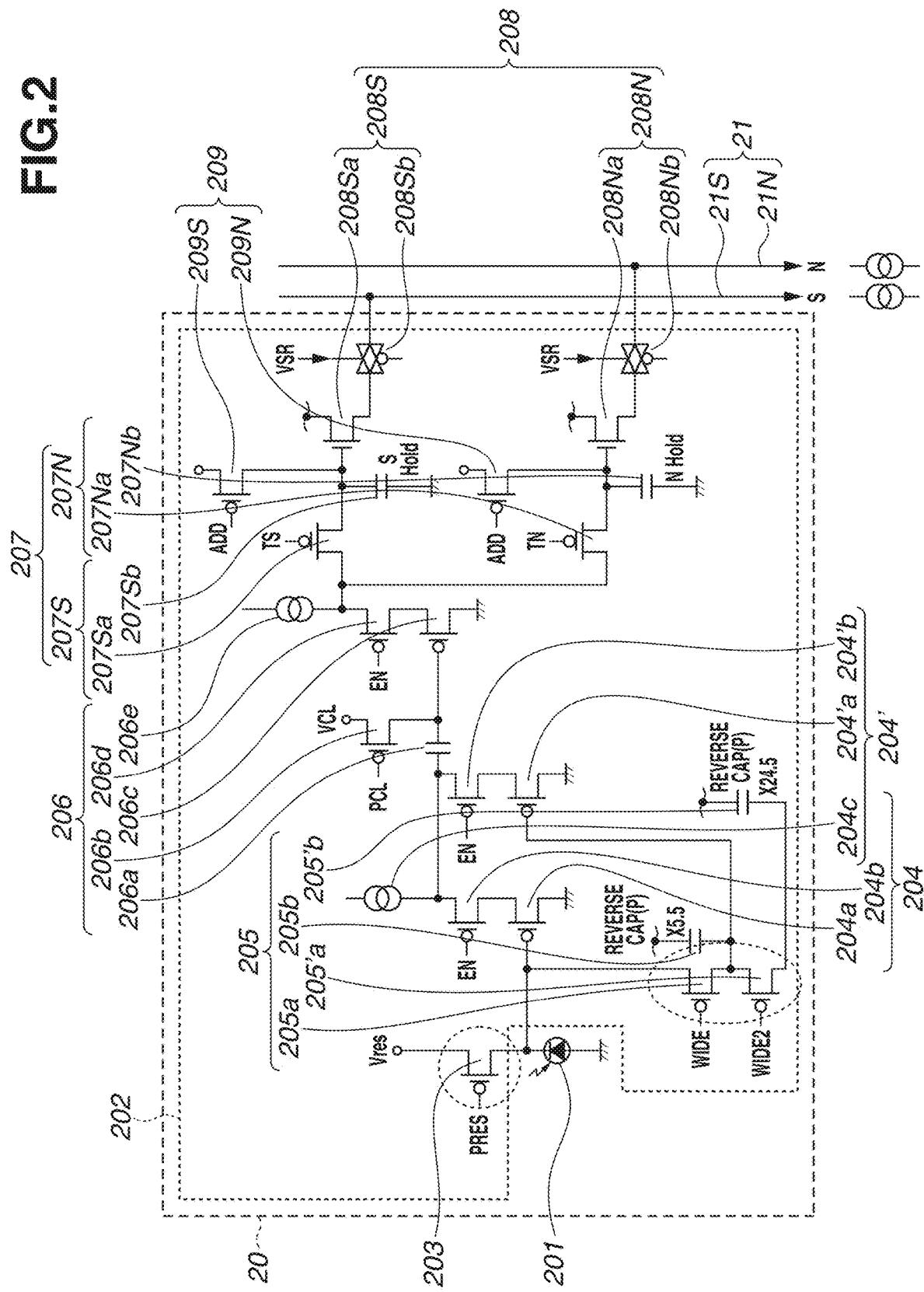
FIG. 2 is a diagram illustrating an example of an equivalent circuit of a pixel included in a radiation detection unit included in a flat panel detector (FPD) illustrated in FIG. 1.

FIG. 2 is a diagram illustrating an example of an equivalent circuit of a pixel 20 included in the radiation detection unit included in the FPD 130 illustrated in FIG. 1. As illustrated in FIG. 2, a pixel 20 includes a conversion element 201 and an output circuit unit 202.

The conversion element 201 is an element for converting the incident radiation R into electric charge that is an electrical signal. An indirect conversion element including a scintillator (phosphor) for converting the incident radiation R into light (e.g., visible light) and a photoelectric conversion element for converting the light generated from the scintillator into electric charge (electrical signal), can be applied as the conversion element 201. If the indirect conversion element is applied as the conversion element 201, the photoelectric conversion element can typically be a photodiode. In the present exemplary embodiment, a direct conversion element that directly converts the incident radiation R into electric charge (electrical signal) can also be applied as the conversion element 201. The following description deals with a case where an indirect conversion element is applied as the conversion element 201.

The output circuit unit 202 includes a reset switch 203, an amplification circuit unit 204, a clamp circuit unit 206, a sample-and-hold circuit unit 207, and a selection circuit unit 208. The conversion element 201 includes a charge accumulation portion. The charge accumulation portion of the conversion element 201 is connected to the gate of a metal-oxide-semiconductor (MOS) transistor 204a of the amplification circuit unit 204. The source of the MOS transistor 204a of the amplification circuit unit 204 is connected to a current source 204c via a MOS transistor 204b. The MOS transistor 204a and the current source 204c constitute a source follower circuit. The MOS transistor 204b is an enable switch that turns on to bring the source follower circuit into an operating state when an enable signal EN supplied to the gate becomes an active level.

In the example illustrated in FIG. 2, the charge accumulation portion of the conversion element 201 and the gate of the MOS transistor 204a of the amplification circuit unit 204 constitute a common node. The common node functions as a charge-voltage conversion portion for converting into a voltage the charge accumulated in the charge accumulation portion of the conversion element 201. More specifically, a voltage $V (=Q/C)$ determined by a charge Q accumulated in the charge accumulation portion of the conversion element 201 and a capacitance C of the charge-voltage conversion portion appears on the charge-voltage conversion portion. The charge-voltage conversion portion is connected to a reset potential Vres via the reset switch 203. If the reset signal PRES becomes an active level, the reset switch 203 turns on to reset the potential of the charge-voltage conversion portion to the reset potential Vres.

The clamp circuit unit 206 clamps noise output from the amplification circuit unit 204 based on the potential of the reset charge-voltage conversion portion with a clamp capacitor 206a. In other words, the clamp circuit unit 206 is a circuit for cancelling the noise in the signal output from the source follower circuit based on the charge generated from the conversion element 201. The noise includes kTC noise generated upon resetting. The clamping is performed by setting a clamp signal PCL to an active level to turn on a MOS transistor 206b and then setting the clamp signal PLC to an inactive level to turn off the MOS transistor 206b. The output of the clamp capacitor 206a is connected to the gate of a MOS transistor 206c. The source of the MOS transistor 206c is connected to a current source 206e via a MOS transistor 206d. The MOS transistor 206c and the current source 206e constitute a source follower circuit. The MOS transistor 206d is an enable switch that turns on to bring the source follower circuit into an operating state when an enable signal ENO supplied to its gate becomes an active level.

The signal output from the clamp circuit unit 206 based on the charge occurring from the conversion element 201 is written as a light signal into a capacitor 207Sb via a switch 207Sa when a light signal sampling signal TS becomes an active level. The signal output from the clamp circuit unit 206 when the MOS transistor 206b is turned on immediately after the above-described resetting of the potential of the charge-voltage conversion portion is a clamp voltage. This signal is written as a noise signal into a capacitor 207Nb via a switch 207Na when a noise sampling signal TN becomes an active level. The noise signal includes an offset component of the clamp circuit unit 206. The switch 207Sa and the capacitor 207Sb constitute a signal sample-and-hold circuit 207S. The switch 207Na and the capacitor 207Nb constitute a noise sample-and-hold circuit 207N. The sample-and-hold circuit 207 includes the signal sample-and-hold circuit 207S and the noise sample-and-hold circuit 207N.

If a drive control unit (e.g., vertical shift register 132 in FIG. 3 to be described below) included in the FPD 130 drives a row selection signal to an active level, the signal (light signal) held in the capacitor 207Sb is output to a signal line 21S via a MOS transistor 208Sa and a row selection switch 208Sb. At the same time, the signal (noise signal) held in the capacitor 207Nb is output to a signal line 21N via a MOS transistor 208Na and a row selection switch 208Nb. The MOS transistor 208Sa and a not-illustrated constant current source located on the signal line 21S constitute a source follower circuit. Similarly, the MOS transistor 208Na and a not-illustrated constant current source located on the signal line 21N constitute a source follower circuit. The MOS transistor 208Sa and the row selection switch 208Sb constitute a signal selection circuit unit 208S. The MOS transistor 208Na and the row selection switch 208Nb constitute a noise selection circuit unit 208N. The selection circuit unit 208 includes the signal selection circuit unit 208S and the noise selection circuit unit 208N.

The pixel 20 may include an addition switch 209S for adding the light signals of a plurality of adjacent pixels 20. In an addition mode, an addition mode switch ADD becomes an active level, and the addition switch 209S turns on. The capacitors 207Sb of the adjacent pixels 20 are mutually connected through the addition switch 209S, whereby the light signals are averaged. Similarly, the pixel 20 may include an addition switch 209N for adding the noises of the plurality of adjacent pixels 20. If the addition switch 209N is turned on, the capacitors 207Nb of the adjacent pixels 20 are mutually connected through the addition switch 209N, whereby the noises are averaged. The addition unit 209 includes the addition switches 209S and 209N.

The pixel 20 may further include a sensitivity change unit 205 for changing sensitivity. For example, the pixel 20 can include a first sensitivity change switch 205a, a second sensitivity change switch 205'a, and accompanying circuit elements. If a first change signal WIDE becomes an active level, the first sensitivity change switch 205a turns on to add the capacitance of a first additional capacitor 205b to that of the charge-voltage conversion portion. This lowers the sensitivity of the pixel 20. If a second change signal WIDE2 becomes an active level, the second sensitivity change switch 205'a turns on to add the capacitance of a second additional capacitor 205b to that of the charge-voltage conversion portion. This further lowers the sensitivity of the pixel 20. Adding the function of lowering the sensitivity of the pixel 20 enables reception of a greater amount of light and can increase the dynamic range. If the first change signal WIDE becomes the active level, an enable signal ENw may be turned to an active level so that a MOS transistor 204'a makes the source follower operation instead of the MOS transistor 204a.

Figure 3:
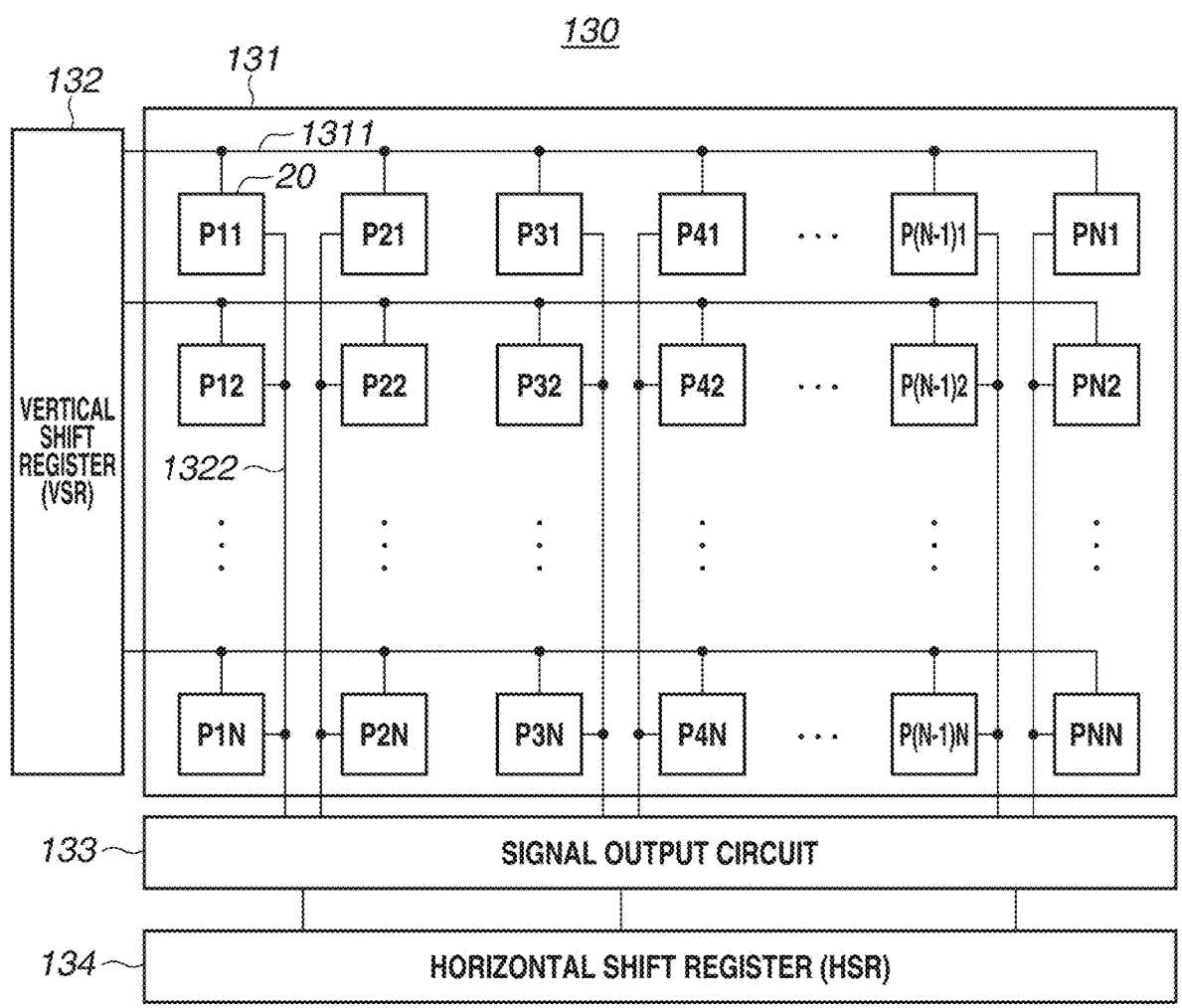
FIG. 3 is a block diagram illustrating an example of an internal configuration of the FPD illustrated in FIG. 1.

FIG. 3 is a block diagram illustrating an example of the internal configuration of the FPD 130 illustrated in FIG. 1. As illustrated in FIG. 3, the FPD 130 includes the radiation detection unit 131, the vertical shift register (VSR) 132, a signal output circuit 133, and a horizontal shift register (HSR) 134.

The radiation detection unit 131 is a detection unit in which a plurality of pixels 20 for detecting the incident radiation R and outputting an electrical signal related to a radiation image is two-dimensionally arranged (more specifically, in a matrix). The radiation detection unit 131 further includes driving lines 1311 that connect the plurality of pixels 20 two-dimensionally arranged (more specifically, in a matrix) in a row direction, and signal lines 1312 that connect the plurality of pixels 20 two-dimensionally arranged (more specifically, in a matrix) in a column direction. The driving lines 1311 are lines for supplying drive signals from the VSR 132 to the pixels 20 connected to the driving lines 1311. The signal lines 1312 are lines for outputting the electrical signals of the charges accumulated in the respective pixels 20 to the signal output circuit 133. In the example illustrated in FIG. 3, the signal lines 1312 are a plurality of lines arranged to correspond to respective adjacent pixels 20 (e.g., pixel P11 and P21). The signal lines 1312 are a plurality of lines for outputting the electrical signals of the charges accumulated in the respective pixels 20. More specifically, in the example illustrated in FIG. 3, there are two signal lines 1312 between adjacent pixels 20 in a first column and a second column. There are two signal lines 1312 between adjacent pixels 20 in a third column and a fourth column. There are two signal lines 1312 between adjacent pixels 20 in an (n−1)th column and an $n_{th}$ column. To put it in general terms, in the example illustrated in FIG. 3, there are two signal lines 1312 for outputting the electrical signals of charges accumulated in respective pixels 20 between the adjacent pixels 20 in an odd-numbered column and an even-numbered column.

The VSR 132 is a component unit for supplying the drive signals to the pixels 20 connected to the driving lines 1311 via the respective driving lines 1311. The signal output circuit 133 is a component unit for obtaining electrical signals related to a radiation image from the pixels 20 connected to the signal lines 1312 via the respective signal lines 1312, and outputting the electrical signals as a radiation image to the control unit 141 of FIG. 1. The HSR 134 is a component unit for driving the signal output circuit 133 column by column.

Figure 4:
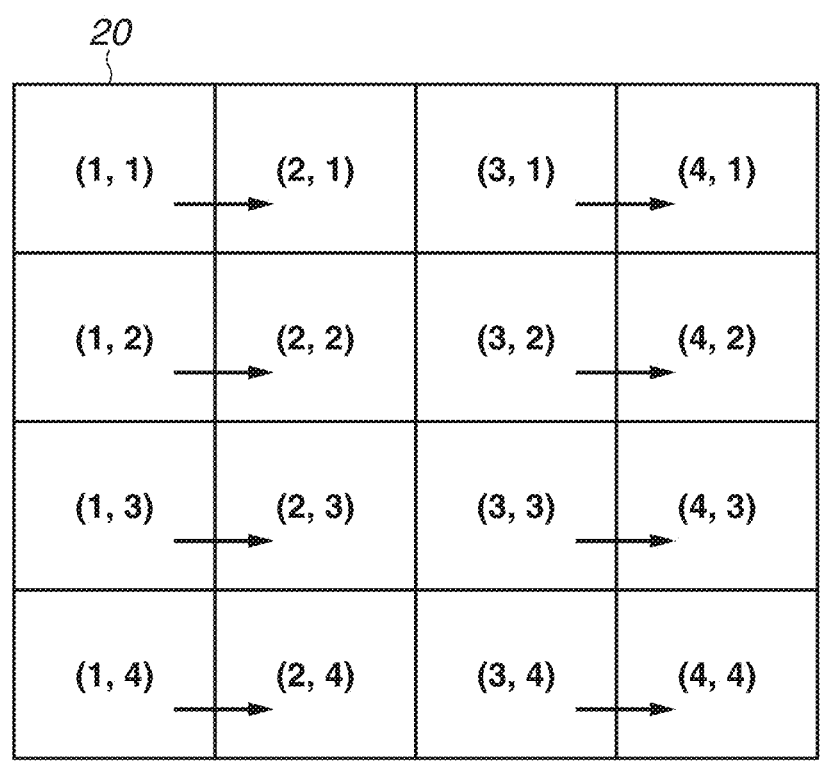
FIG. 4 is a diagram illustrating crosstalk occurring between adjacent pixels with signal lines therebetween in the radiation detection unit illustrated in FIG. 3.

FIG. 4 is a diagram illustrating crosstalk occurring between pixels 20 adjacent with signal lines 1312 therebetween in the radiation detection unit 131 illustrated in FIG. 3. In FIG. 4, the pixel P11 illustrated in FIG. 3 is denoted as (1, 1), the pixel P21 illustrated in FIG. 3 as (2, 1), a pixel P31 illustrated in FIG. 3 as (3, 1), and a pixel P41 illustrated in FIG. 3 as (4, 1). Other pixels 20 are also illustrated in a similar manner.

As described above with reference to FIG. 3, there are two signal lines 1312 between the adjacent pixels 20 in the first column and the second column. There are two signal lines 1312 between the adjacent pixels 20 in the third column and the fourth column. Of the pixels 20 in an odd-numbered column and the pixels 20 in an even-numbered column adjacent with signal lines 1312 therebetween, the signal output circuit 133 first reads the electrical signals of the pixels 20 in the odd-numbered column and then reads the electrical signals of the pixels 20 in the even-numbered column. The inventor has found that, of the pixels 20 in an odd-numbered column and the pixels 20 in an even-numbered column adjacent with signal lines 1312 therebetween, the reading of the electrical signals from the pixels 20 in the odd-numbered column causes crosstalk to the pixels 20 in the even-numbered column from which the electrode signals are read latter. More specifically, the inventor has found that crosstalk occurs in the direction illustrated by the arrows in FIG. 4. However, while the reading direction of the electrical signals in this case is from the pixels 20 in the odd-numbered columns to the pixels 20 in the even-numbered columns, crosstalk occurs in a reverse direction to that illustrated by the arrows in FIG. 4 if the reading direction of the electrode signals is reversed. The inventor has found that the crosstalk that a pixel 20 causes to the adjacent pixel 20 is thus often affected by the lines interposed therebetween (specifically, signal lines 1312). The inventor then has conceived of performing efficient correction processing by correcting the pixel data of the pixels 20 affected by crosstalk, instead of correcting all the pixel data of the pixels 20 around each pixel 20, in correcting the plurality of pieces of pixel data constituting a radiation image.

Figure 5:
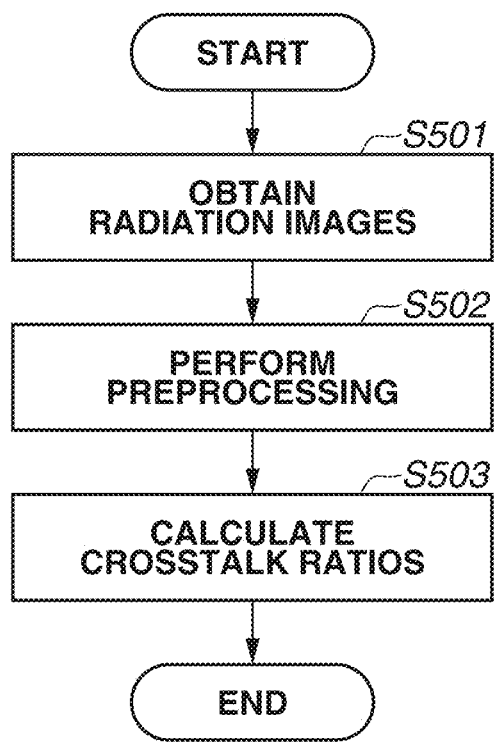
FIG. 5 is a flowchart illustrating an example of a processing procedure of a method for controlling the radiation imaging apparatus according to the first exemplary embodiment of the disclosure.

FIG. 5 is a flowchart illustrating an example of a processing procedure of a method for controlling the radiation imaging apparatus 100 according to the first exemplary embodiment of the disclosure. More specifically, FIG. 5 is a flowchart illustrating an example of a processing procedure of a processing method for calculating crosstalk ratios to be used as an advance preparation for crosstalk correction.

First, in step S501, the control unit 141 obtains a plurality of radiation images generated by uniform irradiation with radiation R without an object H at each of various doses of the radiation R from the FPD 130. In one embodiment, a range of doses of the radiation R in obtaining the plurality of radiation images is a range where the output from the radiation detection unit 131 is proportional to the amount of radiation, with nine or more measurement points.

In step S502, the preprocessing unit 1451 of the image processing unit 145 performs preprocessing on the radiation images obtained in step S501. The preprocessing performed in this step S502 includes, for example, offset correction processing, gain correction processing, defective pixel correction processing, and averaging processing of radiation images obtained at each radiation dose. The radiation image (gain correction image) used for gain correction processing is fixed at a position.

In step S503, using the radiation images averaged in the preprocessing step S502, the crosstalk ratio calculation unit 1452 of the image processing unit 145 calculates a crosstalk ratio $C_x$ at each radiation dose by the following equation (1):

$$C_x = \frac{1}{\frac{W}{2}-1} \times \sum_{k=0}^{\frac{W}{2}-1} \left\{ \sum_{n=0}^{H} P_{(2(k+1),n)} / \sum_{n=0}^{H} P_{(2k+1,n)} \right\}. \quad (1)$$

In equation (1), W is the horizontal image size of the radiation image, H is the vertical size of the radiation image, and P is a pixel value of the radiation image.

Next, using the crosstalk ratios $C_x$ calculated by equation (1) and the average pixel values of the radiation images from which the crosstalk ratios $C_x$ are calculated, the crosstalk ratio calculation unit 1452 calculates an approximation f(x) of the crosstalk ratios $C_x$ with respect to the pixel values as expressed by the following equation (2). In the present exemplary embodiment, the approximation f(x) is a quadratic or higher-order multidimensional function and can be calculated by the least squares method or the like, for example. In the present exemplary embodiment, the approximation f(x) will be described as a quadratic function:

$$f(x) = ax^2 + bx + c. \quad (2)$$

Figure 6:
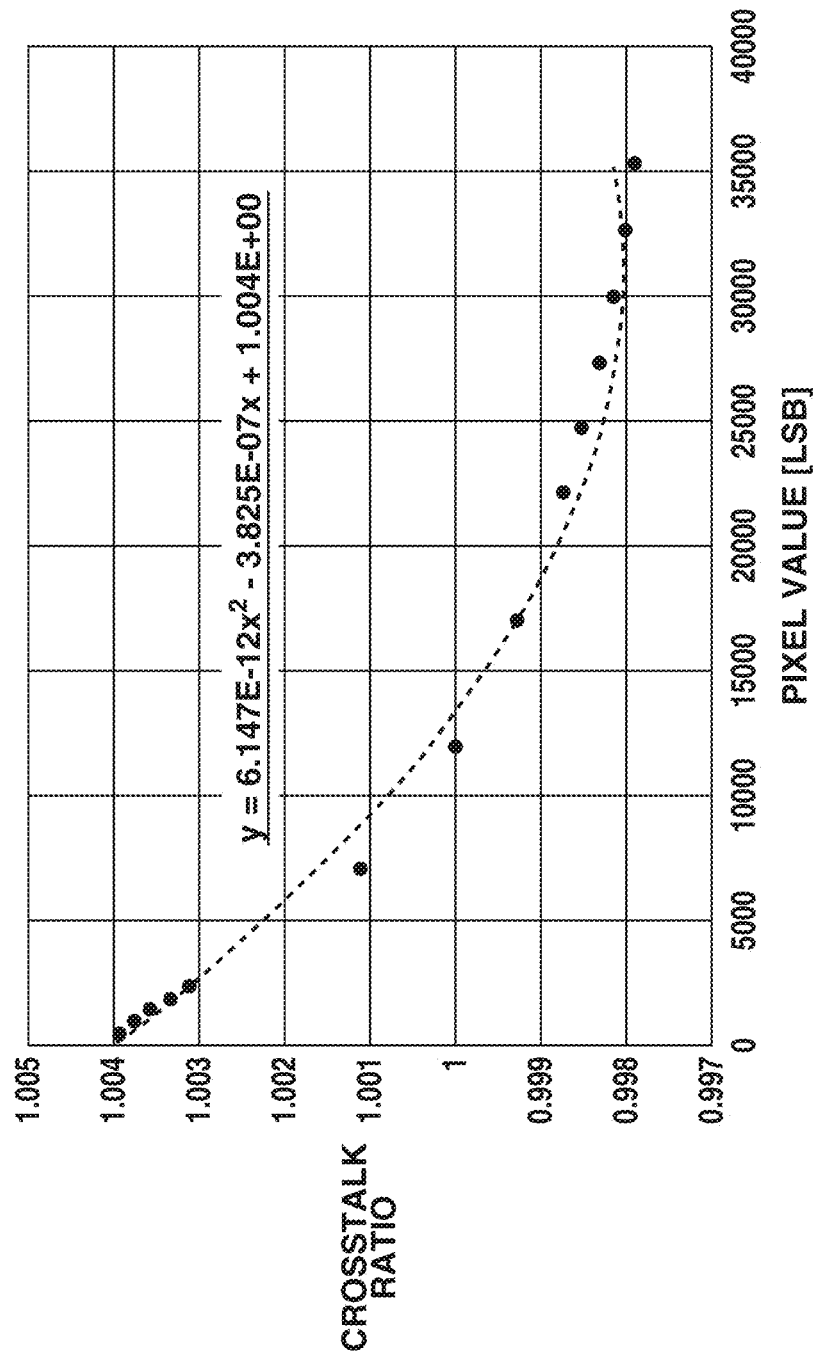
FIG. 6 is a chart illustrating an example of an approximation of crosstalk ratios calculated in step S503 of FIG. 5.

In equation (2), a, b, and c are coefficients of the approximation of the crosstalk ratios. FIG. 6 is a chart illustrating an example of the approximation f(x) of the crosstalk ratios $C_x$ calculated in step S503 of FIG. 5. FIG. 6 illustrates the relationship between the pixel values of the radiation images (horizontal axis) and the crosstalk ratios $C_x$ (vertical axis).

The mechanism for calculating the approximation f(x) of the crosstalk ratios $C_x$ does not need to be included in the image processing unit 145. For example, previously-calculated coefficients a, b, and c of the quadratic function expressed by equation (2) may be simply stored in the storage unit 144. The coefficients a, b, and c in equation (2) may be calculated at a time of product delivery inspection, or fixed values common to all products may be applied.

Figure 7:
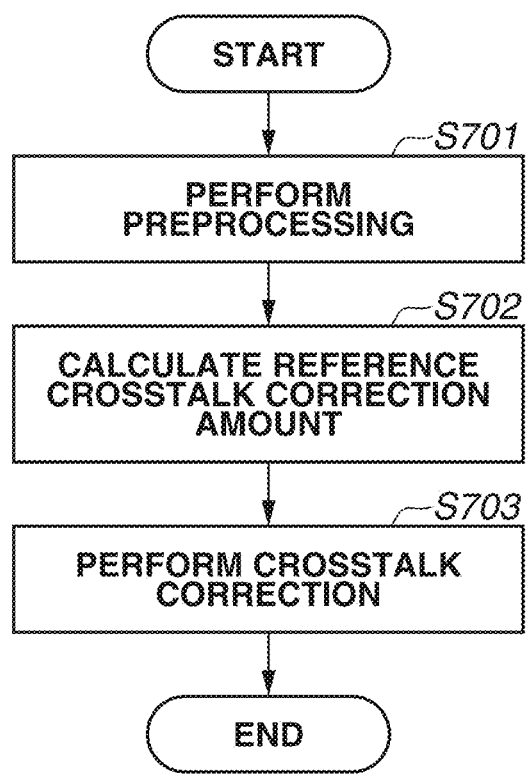
FIG. 7 is a flowchart illustrating an example of a processing procure of the method for controlling the radiation imaging apparatus according to the first exemplary embodiment of the disclosure.

FIG. 7 is a flowchart illustrating an example of a processing procedure of the method for controlling the radiation imaging apparatus 100 according to the first exemplary embodiment of the disclosure. More specifically, FIG. 7 is a flowchart illustrating an example of a processing procedure of a processing method for correcting crosstalk.

In starting the processing of FIG. 7, first the control unit 141 transfers a radiation image generated by the FPD 130 to the image processing unit 145.

In step S701, the preprocessing unit 1451 of the image processing unit 145 applies appropriate preprocessing to the radiation image transferred from the control unit 141. The preprocessing performed in step S701 includes, for example, the offset correction processing, the gain correction processing, and the defective pixel correction processing.

In step S702, the crosstalk ratio calculation unit 1452 of the image processing unit 145 calculates a reference crosstalk correction amount $C_p$ by using the average pixel value of the gain correction image in the preprocessing in step S701 and the following equation (3):

$$C_p = ax^e + bx + c. \quad (3)$$

In equation (3), a, b, and c are the coefficients used in approximating the previously-obtained crosstalk ratios $C_x$ by the quadratic function f(x), and are stored, for example, in the storage unit 144 in advance. In equation (3), x is the average pixel value of the gain correction image. If the gain correction image used in calculating the crosstalk ratios $C_x$ is also used in radiation imaging, the reference crosstalk correction amount $C_p$ does not need to be calculated and may be set to 1.

In step S703, using the captured radiation image and the reference crosstalk correction amount $C_p$, the crosstalk correction unit 1453 of the image processing unit 145 calculates crosstalk correction amounts $C_{(2(k+1),\ n)}$ expressed by the following equation (4), and performs crosstalk correction expressed by the following equation (5):

$$C_{(2(k+1),n)} = \frac{a \times P_{(2k+1,n)}^2 + b \times P_{(2k+1,n)} + c}{C_p}, \text{ and} \quad (4)$$

In equations (4) and (5), P is a pixel value of the radiation image, and the subscripts k and n of P are the coordinates of the pixel data in the radiation image.

Figure 8:
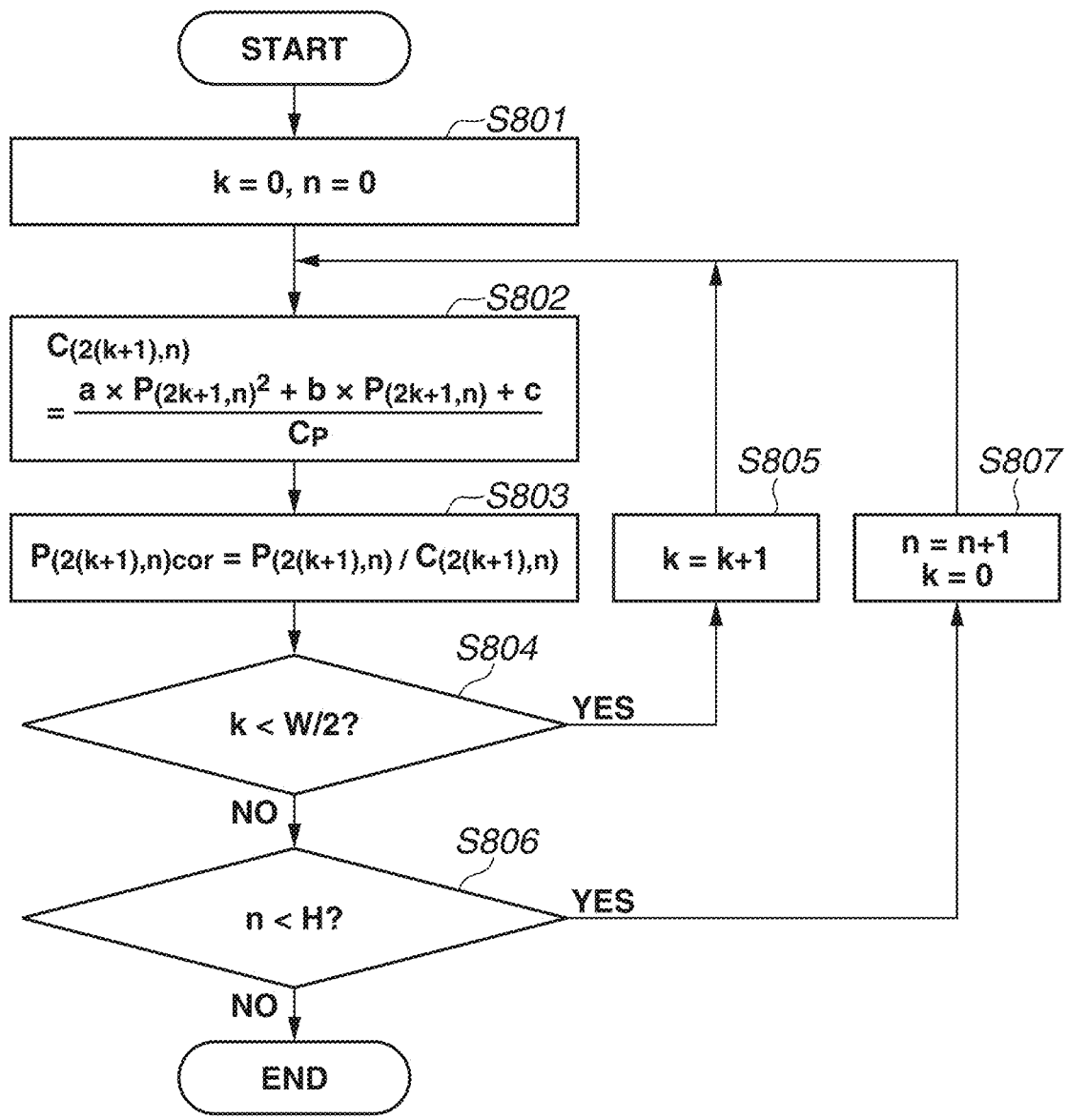
FIG. 8 is a flowchart illustrating an example of a detailed processing procedure in step S703 of FIG. 7.

FIG. 8 is a flowchart illustrating an example of a detailed processing procedure in step S703 of FIG. 7.

In step S801, the crosstalk correction unit 1453 of the image processing unit 145 initializes the coordinates (k, n) of pixel data to be set to (0, 0).

In step S802, the crosstalk correction unit 1453 of the image processing unit 145 calculates the crosstalk calculation amount $C_{(2(k+1), n)}$ expressed by equation (4).

In step S803, the crosstalk correction unit 1453 of the image processing unit 145 performs the crosstalk correction expressed by equation (5).

In step S804, the crosstalk correction unit 1453 of the image processing unit 145 determines whether the crosstalk correction processing in the row direction of the radiation image has been completed.

If, in step S804, the crosstalk correction processing in the row direction of the radiation image is determined to have been uncompleted (YES in step S804), the processing proceeds to step S805.

In step S805, the crosstalk correction unit 1453 of the image processing unit 145 increments the value of k. Then, the processing returns to step S802.

On the other hand, if, in step S804, the crosstalk correction processing in the row direction of the radiation image is determined to have been completed (NO in step S804), the processing proceeds to step S806.

In step S806, the crosstalk correction unit 1453 of the image processing unit 145 determines whether the crosstalk correction processing in the column direction of the radiation image has been completed.

If, in step S806, the crosstalk correction processing in the column direction of the radiation image is determined to have been uncompleted (YES in step S806), the processing proceeds to step S807.

In step S807, the crosstalk correction unit 1453 of the image processing unit 145 increments the value of n and sets the value of k to 0. Then, the processing returns to step S802.

On the other hand, if, in step S806, the crosstalk correction processing in the column direction of the radiation image is determined to have been completed (NO in step S806), the crosstalk correction processing in step S703 of FIG. 7 ends.

Figure 9A:
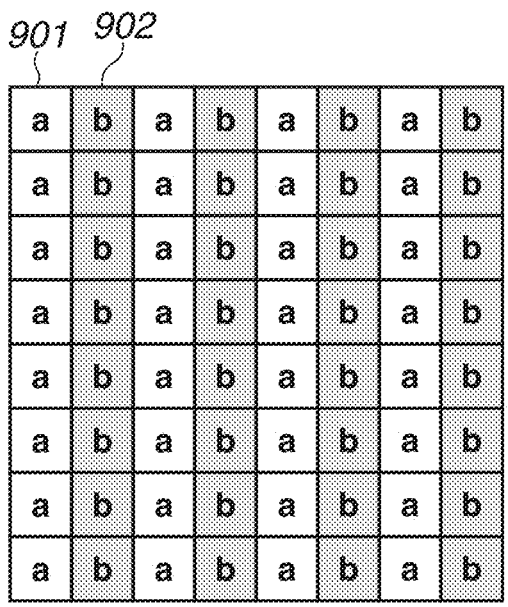
FIGS. 9A and 9B are diagrams illustrating crosstalk correction processing performed on a radiation image by a crosstalk correction unit illustrated in FIG. 1.
Figure 9B:
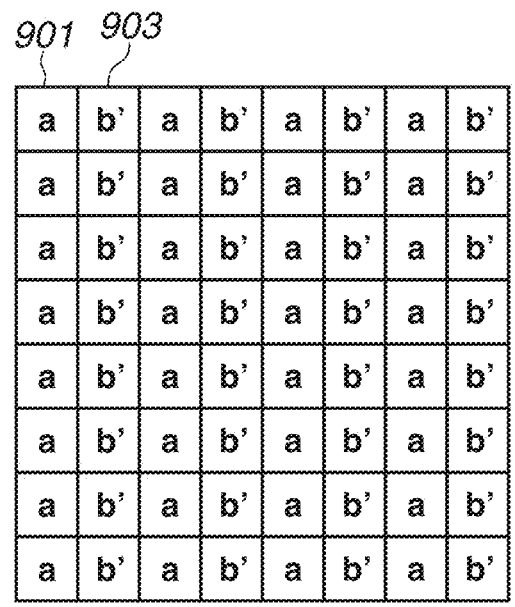

FIGS. 9A and 9B are diagrams illustrating the crosstalk correction processing performed on a radiation image by the crosstalk correction unit 1453 illustrated in FIG. 1.

A radiation image A illustrated in FIG. 9A represents a radiation image obtained when the entire surface of the FPD 130 is uniformly irradiated with the radiation R. In the radiation image A illustrated in FIG. 9A, pixel data a (901) represents pixel data on pixels 20 in the odd-numbered columns where the electrical signals are first read among the pixels 20 adjacent with the signal lines 1312 therebetween. Pixel data b (902) represents pixel data on the pixels 20 in the even-numbered columns where the electrical signals are read latter. Here, the pixels 20 in the even-numbered columns related to the pixel data b (902) output the pixel data b (902) fluctuated from the pixel data a (901) because of the crosstalk caused in reading the electrical signals from the pixels 20 in the odd-numbered columns related to the pixel data a (901). The crosstalk correction unit 1453 thus corrects the pixel data b (902) of the crosstalk-affected pixels 20 in the even-numbered columns among the plurality of pieces of pixel data constituting the radiation image A, based on the crosstalk ratios $C_x$. More specifically, the crosstalk correction unit 1453 makes corrections to replace the pixel data b (902) of the crosstalk-affected pixels 20 in the even-numbered columns among the plurality of pieces of pixel data constituting the radiation image A with pixel data b' (903) as illustrated in FIG. 9B. In this way, the crosstalk correction unit 1453 thereby generates a corrected image B of uniform output level.

In the radiation imaging apparatus 100 according to the above-described first exemplary embodiment, the crosstalk ratio calculation unit 1452 calculates the crosstalk ratios $C_x$ related to the crosstalk generated between the pixels 20 adjacent with the signal lines 1312 therebetween in the radiation detection unit 131. The crosstalk correction unit 1453 then corrects the pixel data b (902) of the crosstalk-affected pixels 20 among the plurality of pieces of pixel data constituting the radiation image based on the crosstalk ratios $C_x$.

With such a configuration, pixel data of pixels affected by crosstalk among a plurality of pieces of pixel data constituting a radiation image can be efficiently corrected. This can efficiently reduce degradation in the image quality of the radiation image.

Specifically, in the present exemplary embodiment, the crosstalk ratios $C_x$ can be accurately calculated without need of a precise irradiation device of radiation R, by calculating the crosstalk ratios $C_x$ for a gain-corrected radiation image. Moreover, by taking into consideration the layout of the signal lines 1312 in the radiation detection unit 131, the crosstalk can be effectively reduced with a simple technique and the image quality of the radiation image can be improved.

Next, a second exemplary embodiment of the disclosure will be described. In the following description of the second exemplary embodiment of the disclosure, a description of items common with the above-described first exemplary embodiment will be omitted, and differences from the above-described first exemplary embodiment will be described.

The above-described first exemplary embodiment has dealt with the case where the pixels 20 in the respective rows of the radiation detection unit 131 are similarly driven for image reading. However, it is known that the amount of crosstalk varies depending on the driving method for reading. Thus, in the second exemplary embodiment, an embodiment in which correction coefficients are introduced into the respective rows of the radiation detection unit 131 to easily correct crosstalk even if the rows of the radiation detection unit 131 are driven for image reading differently.

A radiation imaging apparatus according to the second exemplary embodiment has a schematic configuration similar to that of the radiation imaging apparatus 100 according to the first exemplary embodiment illustrated in FIG. 1. The equivalent circuit of a pixel included in the radiation detection unit according to the second exemplary embodiment is also similar to that of the pixel 20 included in the radiation detection unit according to the first exemplary embodiment illustrated in FIG. 2. The FPD 130 according to the second exemplary embodiment has an internal configuration similar to that of the FPD 130 according to the first exemplary embodiment illustrated in FIG. 3.

Now, a processing method for calculating crosstalk ratios to be used as an advance preparation for crosstalk correction in the second exemplary embodiment will be described with reference to FIG. 5.

In the second exemplary embodiment, in step S501 of FIG. 5, first the control unit 141 obtains a plurality of radiation images generated by uniform irradiation with radiation R without an object H at each of various doses of the radiation R from the FPD 130. Like the first exemplary embodiment, a range of doses of the radiation R in obtaining the plurality of radiation images is a range in which the output from the radiation detection unit 131 is proportional to the amount of radiation, with nine or more measurement points.

In step S502, the preprocessing unit 1451 of the image processing unit 145 performs preprocessing on the radiation images obtained in step S501. The preprocessing performed in this step S502 includes, for example, offset correction processing, gain correction processing, defective pixel correction processing, and averaging processing for radiation images obtained at each radiation dose. The radiation image (gain correction image) used for gain correction processing is fixed at a position.

In step S503, using the radiation images averaged in the preprocessing in step S502, the crosstalk ratio calculation unit 1452 of the image processing unit 145 calculates a crosstalk ratio $C_{line}$ in each row of the radiation detection unit 131 at each radiation dose by the following equation (6):

$$C_{line}(n) = \frac{1}{\frac{W}{2}-1} \times \sum_{}^{\frac{W}{2}-1} \{P_{(2(k+1),n)}/P_{(2k+1,n)}\}. \tag{6}$$

In equation (6), W is the horizontal image size of the radiation image, P is a pixel value of the radiation image, and n represents an $n_{th}$ scan row.

Next, using the crosstalk ratios $C_{line}(n)$ calculated by equation (6) and the average pixel values of the radiation images from which the crosstalk ratios $C_{line}(n)$ are calculated, the crosstalk ratio calculation unit 1452 calculates approximation $f_n(x)$ of the crosstalk ratio $C_{line}(n)$ with respect to the pixel value as expressed by the following equation (7). In the present exemplary embodiment, the approximation $f_n(x)$ is a quadratic or higher-order multidimensional function and can be calculated by the least squares method or the like, for example. In the present exemplary embodiment, the approximation $f_n(x)$ will be described to be a quadratic function:

$$f_n(x)=a(n)x^2+b(n)x+c(n). \tag{7}$$

In equation (7), a(n), b(n), and c(n) are the coefficients of the approximation of the crosstalk ratio in the nth scan row.

The mechanism for calculating the approximation $f_n(x)$ of the crosstalk ratio $C_{line}(n)$ does not need to be included in the image processing unit 145. For example, previously-calculated coefficients a(n), b(n), and c(n) of the quadratic function expressed by equation (7) may be simply stored in the storage unit 144. The coefficients a(n), b(n), and c(n) in equation (7) may be calculated in product delivery inspection. Fixed values common to all products may be applied. $C_{line}(n)$ expressed by equation (6) and the coefficients a(n), b(n), and c(n) in equation (7) may be stored as functions with the row number n as a variable.

A processing method for correcting crosstalk according to the second exemplary embodiment will be described with reference to FIG. 7.

In starting the processing of FIG. 7, first, the control unit 141 transfers a radiation image generated by the FPD 130 to the image processing unit 145.

In step S701, the preprocessing unit 1451 of the image processing unit 145 performs appropriate preprocessing on the radiation image transferred from the control unit 141. The preprocessing performed in step S701 includes, for example, the offset correction processing, the gain correction processing, and the defective pixel correction processing.

In step S702, the crosstalk ratio calculation unit 1452 of the image processing unit 145 calculates reference crosstalk correction amount $C_p(n)$ by using the average pixel value of the gain correction image in the preprocessing in step S701 and the following equation (8):

$$C_p(n)=a(n)x^2+b(n)x+c(n). \tag{8}$$

In equation (8), a(n), b(n), and c(n) are the coefficients used in approximating the previously-obtained crosstalk ratio $C_{line}(n)$ by the quadratic function $f_n(x)$, and are stored in the storage unit 144 in advance, for example. In equation (8), x is the average pixel value of the gain correction image.

In step S703, using the captured radiation image and the reference crosstalk correction amount $C_p(n)$, the crosstalk correction unit 1453 of the image processing unit 145 calculates crosstalk correction amount $C_{(2(k+1),\ n)}$ expressed by the following equation (9), and performs crosstalk correction expressed by the following equation (10):

$$C_{(2(k+1),n)} = \frac{a(n) \times P^2_{(2k+1,n)} + b(n) \times P_{(2k+1,n)} + c(n)}{C_p(n)}, \text{ and} \tag{9}$$

In equations (9) and (10), P is a pixel value of the radiation image, and the subscripts k and n of P are the coordinates of the pixel data in the radiation image.

As described above, according to the second exemplary embodiment, crosstalk can be easily and appropriately corrected even if the amount of crosstalk varies in the radiation detection unit 131 row by row.

If the same scan method is used for the respective rows of the radiation detection unit 131, the first exemplary embodiment with fewer coefficients to be stored is desirable. If different scan methods are used and the amount of crosstalk varies from one row of the radiation detection unit 131 to another, the second exemplary embodiment is desirable. In either of the first and second exemplary embodiments, the memory to be used and the calculation cost can be reduced and crosstalk can be appropriately reduced, compared to the technique discussed in Japanese Patent Application Laid-Open No. 2005-137509.

Other Exemplary Embodiments

An exemplary embodiment of the disclosure can also be implemented by processing of supplying a program for implementing one or more functions of the above-described exemplary embodiments to a system or an apparatus via a network or a storage medium, and reading and executing the program by one or more processors in a computer of the system or apparatus. A circuit (e.g., application specific integrated circuit (ASIC)) for implementing one or more of the functions can also be used for implementation.

The program and a computer-readable storage medium storing the program are included in the disclosure.

The above-described exemplary embodiments of the disclosure are only examples of embodiment in carrying out the disclosure, and the technical scope of the disclosure should not be interpreted as limited to those exemplary embodiments. In other words, the exemplary embodiments of the disclosure can be practiced in various forms without departing from the technical concept or essential features thereof.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-152113, filed Sep. 10, 2020, which is hereby incorporated by reference herein in its entirety.

What is claimed is:

1. An apparatus comprising:
   at least one processor; and
   a memory coupled to the at least one processor, the memory having instructions that, when executed by the processor, perform operations as:
   a detection unit including a plurality of two-dimensionally arranged pixels with a plurality of lines located between adjacent pixels, configured to detect an incident radiation and output signals related to a radiation image;
   a signal output unit configured to sequentially read the signals via the plurality of lines located between the adjacent pixels;
   a calculation unit configured to perform calculation of a crosstalk ratio related to crosstalk occurring between the adjacent pixels with the plurality of lines therebetween in the detection unit, the calculation being based on a gain-corrected radiation image; and
   a correction unit configured to make a correction to pixel data on a pixel affected by the crosstalk among a plurality of pieces of pixel data constituting the radiation image based on the crosstalk ratio.

2. The apparatus according to claim 1, wherein the detection unit includes two signal lines as the plurality of lines, the two signal lines being two lines arranged to correspond to the respective adjacent pixels and configured to output the signals of the respective pixels.

3. The apparatus according to claim 2, wherein the correction unit is configured to correct the pixel data on a pixel from which the signal is output later to the signal line than the adjacent pixel thereto.

4. The apparatus according to claim 1, wherein the correction unit is configured to calculate a crosstalk correction amount based on the crosstalk ratio and the radiation image, and make the correction by using the crosstalk correction amount.

5. The apparatus according to claim 1, wherein a crosstalk ratio approximated by a multidimensional function is used as the crosstalk ratio.

6. A method for controlling an apparatus including a plurality of two-dimensionally arranged pixels with a plurality of lines located between adjacent pixels, the method comprising:
   detecting, by a detection unit, an incident radiation and outputting signals related to a radiation image;
   reading the signals sequentially via the plurality of line located between the adjacent pixels;
   performing calculation of a crosstalk ratio related to crosstalk occurring between the adjacent pixels with the plurality of lines therebetween in the detection unit, the calculation being based on a gain-corrected radiation image; and
   making a correction to pixel data on a pixel affected by the crosstalk among a plurality of pieces of pixel data constituting the radiation image based on the crosstalk ratio.

7. The method according to claim 6, wherein the detection unit includes two signal lines as the plurality of lines, the two signal lines being two lines arranged to correspond to the respective adjacent pixels and configured to output the signals of the respective pixels.

8. The method according to claim 7, wherein the correcting includes correcting the pixel data on a pixel from which the signal is output later to the signal line than the adjacent pixel thereto.

9. The method according to claim 6, wherein the correcting includes calculating a crosstalk correction amount based on the crosstalk ratio and the radiation image, and making the correction by using the crosstalk correction amount.

10. The method according to claim 6, wherein a crosstalk ratio approximated by a multidimensional function is used as the crosstalk ratio.

11. A storage medium storing a program for causing a computer to perform the method for controlling an apparatus including a plurality of two-dimensionally arranged pixels with a plurality of lines located between adjacent pixels, the method comprising:
   detecting, by a detection unit, an incident radiation and outputting signals related to a radiation image;
   reading the signals sequentially via the plurality of line located between the adjacent pixels;
   performing calculation of a crosstalk ratio related to crosstalk occurring between the adjacent pixels with the plurality of lines therebetween in the detection unit, the calculation being based on a gain-corrected radiation image; and
   making a correction to pixel data on a pixel affected by the crosstalk among a plurality of pieces of pixel data constituting the radiation image based on the crosstalk ratio.

12. The storage medium according to claim 11, wherein the detection unit includes two signal lines as the plurality of lines, the two signal lines being two lines arranged to correspond to the respective adjacent pixels and configured to output the signals of the respective pixels.

13. The storage medium according to claim 12, wherein the correcting includes correcting the pixel data on a pixel from which the signal is output later to the signal line than the adjacent pixel thereto.

14. The storage medium according to claim 11, wherein the correcting includes calculating a crosstalk correction amount based on the crosstalk ratio and the radiation image, and making the correction by using the crosstalk correction amount.

15. The storage medium according to claim 11, wherein a crosstalk ratio approximated by a multidimensional function is used as the crosstalk ratio.

* * * * *